United States Patent
Wu

(10) Patent No.: US 7,712,843 B2
(45) Date of Patent: May 11, 2010

(54) STRUCTURE OF A FOLDABLE FRONT WHEEL OF A GOLF CART

(75) Inventor: Fang-Li Wu, Tainan (TW)

(73) Assignee: Sports World Enterprise Co., Ltd., Tainan Hsien (TW)

( * ) Notice: Subject to any disclaimer, the term of this patent is extended or adjusted under 35 U.S.C. 154(b) by 182 days.

(21) Appl. No.: 12/155,024

(22) Filed: May 29, 2008

(65) Prior Publication Data

US 2009/0295219 A1 Dec. 3, 2009

(51) Int. Cl.
*B60B 35/00* (2006.01)
(52) U.S. Cl. ............... 301/111.06; 301/111.04; 301/124.1; 280/47.17; 280/47.34; 280/646; 403/84; 403/104; 403/109.1
(58) Field of Classification Search ........... 301/111.01, 301/111.04, 111.05, 111.06, 111.07, 112, 301/119, 120, 122, 124.1, 125, 127, 128; 280/47.131, 47.17, 47.24, 47.34, 646; 403/109.1, 403/109.3, 83, 84, 104
See application file for complete search history.

(56) References Cited

U.S. PATENT DOCUMENTS

| | | | | |
|---|---|---|---|---|
| 3,166,339 A * | 1/1965 | Earley | .......... | 280/654 |
| 4,185,848 A * | 1/1980 | Holtz | .......... | 280/652 |
| 4,614,352 A * | 9/1986 | Cervantes | .......... | 280/204 |
| 4,822,071 A * | 4/1989 | Widegren | .......... | 280/646 |
| 4,832,362 A * | 5/1989 | Chen | .......... | 280/645 |
| 4,911,465 A * | 3/1990 | Hauer | .......... | 280/646 |
| 5,039,118 A * | 8/1991 | Huang | .......... | 280/47.371 |
| 5,072,958 A * | 12/1991 | Young | .......... | 280/40 |
| 5,188,389 A * | 2/1993 | Baechler et al. | .......... | 280/650 |
| 5,267,750 A * | 12/1993 | Thompson | .......... | 280/646 |
| 5,765,958 A * | 6/1998 | Lan | .......... | 403/97 |
| 5,979,921 A * | 11/1999 | Derven et al. | .......... | 280/204 |
| 6,070,906 A * | 6/2000 | Allen | .......... | 280/814 |
| 6,152,465 A * | 11/2000 | Shieh | .......... | 280/62 |
| 6,254,305 B1 * | 7/2001 | Taylor | .......... | 403/378 |
| 6,827,356 B2 * | 12/2004 | Zhuang | .......... | 280/32.7 |
| 6,863,297 B2 * | 3/2005 | Shapiro | .......... | 280/646 |
| 7,360,783 B2 * | 4/2008 | Home | .......... | 280/639 |
| 7,464,947 B2 * | 12/2008 | Cortese | .......... | 280/47.27 |
| 2002/0038973 A1 * | 4/2002 | Godwin | .......... | 301/111.04 |
| 2004/0245733 A1 * | 12/2004 | Abel | .......... | 280/39 |
| 2006/0082105 A1 * | 4/2006 | Wu | .......... | 280/651 |
| 2009/0066056 A1 * | 3/2009 | Liao | .......... | 280/297 |

* cited by examiner

*Primary Examiner*—Russell D Stormer
(74) *Attorney, Agent, or Firm*—Rosenberg, Klein & Lee

(57) ABSTRACT

A front wheel of a golf cart includes a supporting component, a round rotating member, and a joining shaft coupling the rotating member to the supporting component; the supporting component includes a holding part, which has an outer stopping protrusion, a polygonal portion, and a round portion adjoining the polygonal portion; the shaft includes a shank partly held in the holding part; a spring biases the shaft to such a position that the shaft is prevented from rotating by the polygonal portion; a fixing component is secured around other end of the shank, and contains the stopping protrusion; the fixing component has a polygonal hollow portion to fit closely around the polygonal portion to prevent the shaft from rotating; the round rotating member can be turned together with the shaft to fold the front wheel after the polygonal hollow portion is relocated around the round portion.

2 Claims, 12 Drawing Sheets

STRUCTURE OF A FOLDABLE FRONT WHEEL OF A GOLF CART

BACKGROUND OF THE INVENTION

1. Field of the Invention

The present invention relates to a foldable front wheel structure of a golf cart, more particularly one, which includes a supporting component, a round rotating member, and a joining shaft coupling the round rotating member to the supporting component; after the joining shaft is disengaged from the supporting component, it can be turned in either of clockwise direction and counterclockwise one to move the front wheel between a stretched in-use position and a folded not-in-use one; therefore, the font wheel can be easily operated by not only those people who prefer using their right hands but also those people who prefer using their left hands.

2. Brief Description of the Prior Art

Golf is getting more popular with heightening of living standard. Because many different types of golf clubs, which are relatively heavy in weight, will be used in a golf game, the golfers usually put their golf clubs in golf bags, and carry the golf bags with golf carts; thus, it won't take the golfers a lot of labor to move the golf clubs around a golf course.

Shown in FIG. 9 is a currently existing foldable front wheel structure of a golf cart, which includes a supporting component 3, a joining shaft 4, and a front round rotating member (not shown in the figures) fitted on the joining shaft 4. The supporting component 3 has a tubular part 31, which has opposite stopping protrusions 32 on an inner side; the angle between the stopping protrusions 32 is 90 degrees. The tubular part 31 further has hollow fixing portions 33 between the opposite stopping protrusions 32. The supporting component 3 further has detainment gaps 34 and through holes 35 thereon.

The joining shaft 4 has a step-shaped portion 41 at a front end thereof, and a shank part 411 adjoining the step-shaped portion 41. The step-shaped portion 41 has a stopping block 42 on a circumferential side thereof. An annular member 44 is positioned around the shank part 411, and an elastic element 43 is positioned between and propped against the step-shaped portion 41 and the annular member 44. The annular member 44 has fixing gaps 441 on a circumferential side thereof. And, a movable member 45 is positioned next to the annular member 44, and secured around the shank part 411; the movable member 45 has several embedded protrusions 451 on a circumferential side thereof. The shank part 411 is joined to the front round rotating member, i.e. the front wheel.

In assembly, referring to FIG. 10, the joining shaft 4 is joined to the tubular part 31 of the supporting component 3 with the stopping blocks 42 being received in a corresponding said hollow fixing portion 33, and with the embedded protrusions 451 of the movable member 45 being embedded in the detainment gaps 34. Next, fixing pins 36 are inserted in the through holes 35 of the supporting component 3, and received in the joining cavities 441 of the annular member 44 so as to fix the annular member 44 on the supporting component 3.

Shown in FIGS. 11 and 12 is the front wheel being under a folding action; first, the shank part 411 of the joining shaft 4 is pulled away from the tubular part 31 of the supporting component 3 so as to separate the stopping block 42 from a corresponding said hollow fixing portion 33; thus, the shank part 411 can be turned relative to the supporting component 3. Second, the shank part 411 is turned 90 degrees leftwards, and the stopping block 42 is stopped by one of the stopping protrusions 32 on the inner side of the tubular part 31; thus, the front wheel is in the folded not-in-use configuration. Next, the use stops pulling the shank part 411; thus, the elastic element 43 forces the joining shaft 4 to move further into the tubular part 31 of the supporting component 3, and the joining shaft 4 is firmly fixed on the supporting component 3 with the stopping block 42 being received in a corresponding said hollow fixing portion 33, and with the embedded protrusions 451 of the movable member 45 being embedded in the detainment gaps 34. Therefore, the front wheel is firmly fixed in the folded not-in-use configuration.

If the user wants to move the front wheel to the stretched in-use position, first he should pull the shank part 411 away from the tubular part 31 of the supporting component 3 so as to separate the stopping block 42 from a corresponding said hollow fixing portion 33. Second, the user turns the shank part 411 rightwards by 90 degrees so that the front wheel is in the stretched in-use configuration. Next, the user stops pulling the shank part 411 in order for the stopping block 42 to be received in a corresponding said hollow fixing portion 33; thus, the front wheel is firmly fixed in the stretched in-use configuration.

The above-mentioned foldable front wheel structure of a golf cart has a drawback: The user is only allowed to turn the joining shaft 4 rightwards by 90 degrees to change the front wheel from the folded not-in-use configuration into the stretched in-use one. Therefore, those people who prefer using their right hands can operate the joining shaft 4 to stretch the front wheel relatively easily, yet the joining shaft 4 can't be easily operated by those people who prefer using their left hands.

Therefore, it is a main object of the present invention to provide an improvement on a front wheel of a golf cart, which is structured in such a manner as to be easily moved between a stretched in-use position and a retreated not-in-use one by those people who prefer using their right hands as well as those people who prefer using their left hands, thus overcoming the above-mentioned problem.

SUMMARY OF THE INVENTION

A front wheel of a golf cart in accordance with an embodiment of the present invention includes a supporting component, a round rotating member, and a joining shaft coupling the rotating member to the supporting component. The supporting component has a shaft holding part, which has an outer stopping protrusion at a free end, a polygonal fixing portion, and a round pivotal portion adjoining the polygonal fixing portion. The joining shaft includes a shank part, which is held in the shaft holding part at one end thereof while an elastic element is installed in the shaft holding part to bias the shaft to such a position that the shaft is prevented from rotating by the polygonal fixing portion. A fixing component is secured around other end of the shank part, and the stopping protrusion is confined in the fixing component.

The fixing component has a polygonal hollow portion, which usually fits closely around the polygonal fixing portion of the supporting component to prevent the joining shaft from rotating. The polygonal hollow portion will be relocated around the round pivotal portion of the supporting component to allow the round rotating member and the joining shaft to change position relative to the supporting component so as to fold the front wheel after the joining shaft is pushed.

Therefore, the joining shaft can be turned in either of clockwise and counterclockwise directions to move the front wheel between an in-use position and a not-in-use one; the font wheel can be easily operated by not only those people who prefer using their right hands but also those people who prefer using their left hands.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
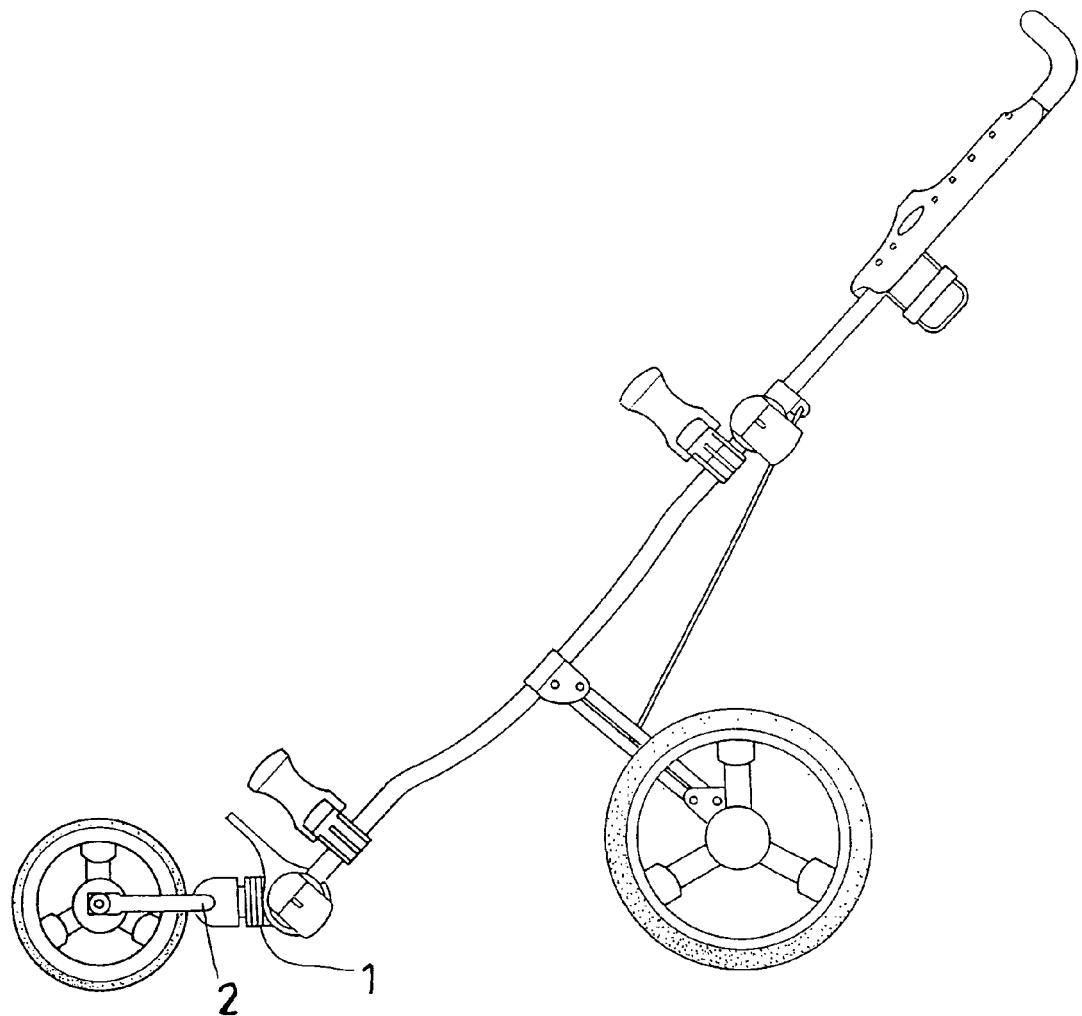
FIG. 1 is a side view of a golf cart with the front wheel of the present invention in the stretched in-use position.
Figure 2:
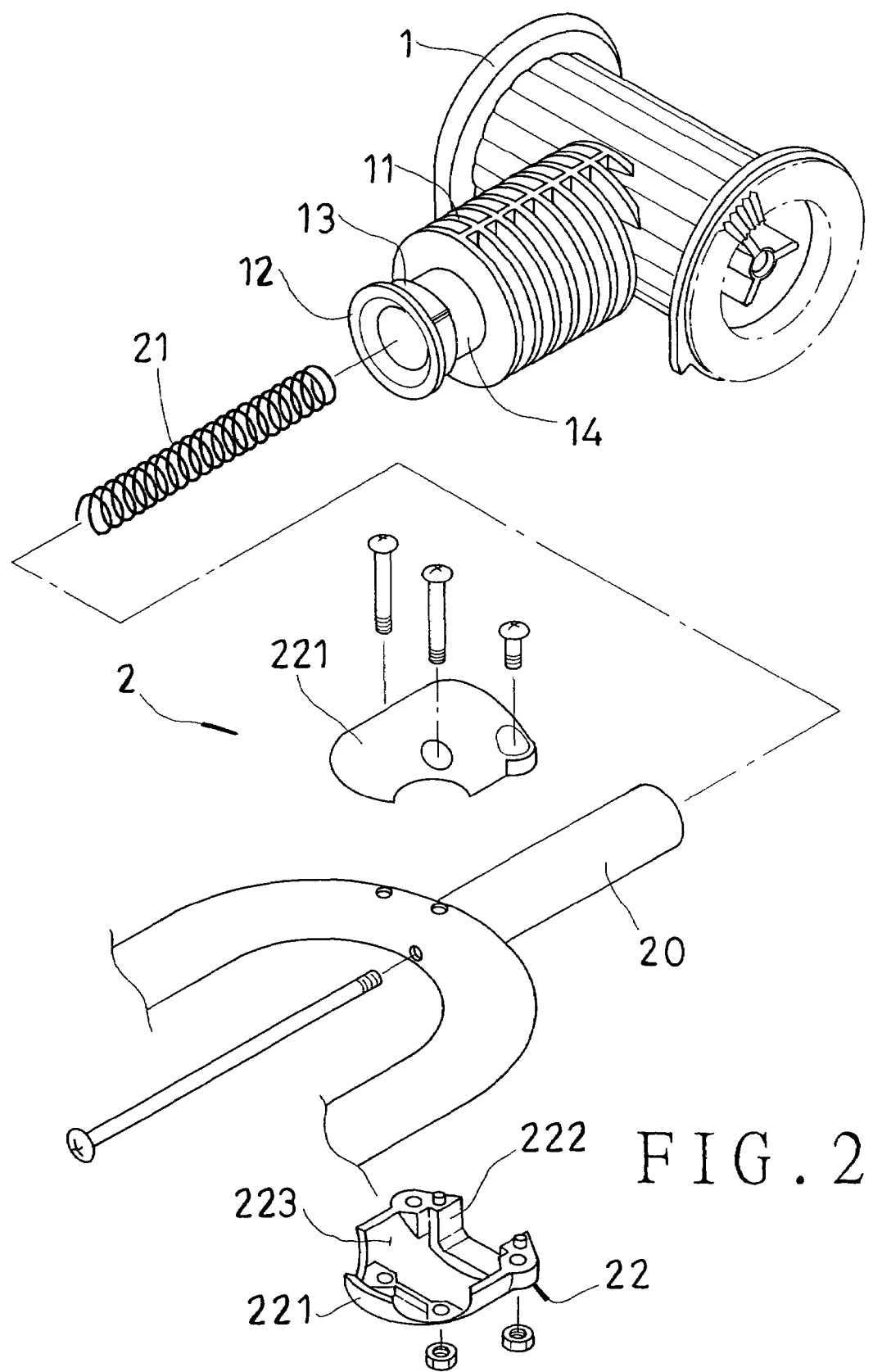
FIG. 2 is an exploded perspective view of the present invention.
Figure 3:
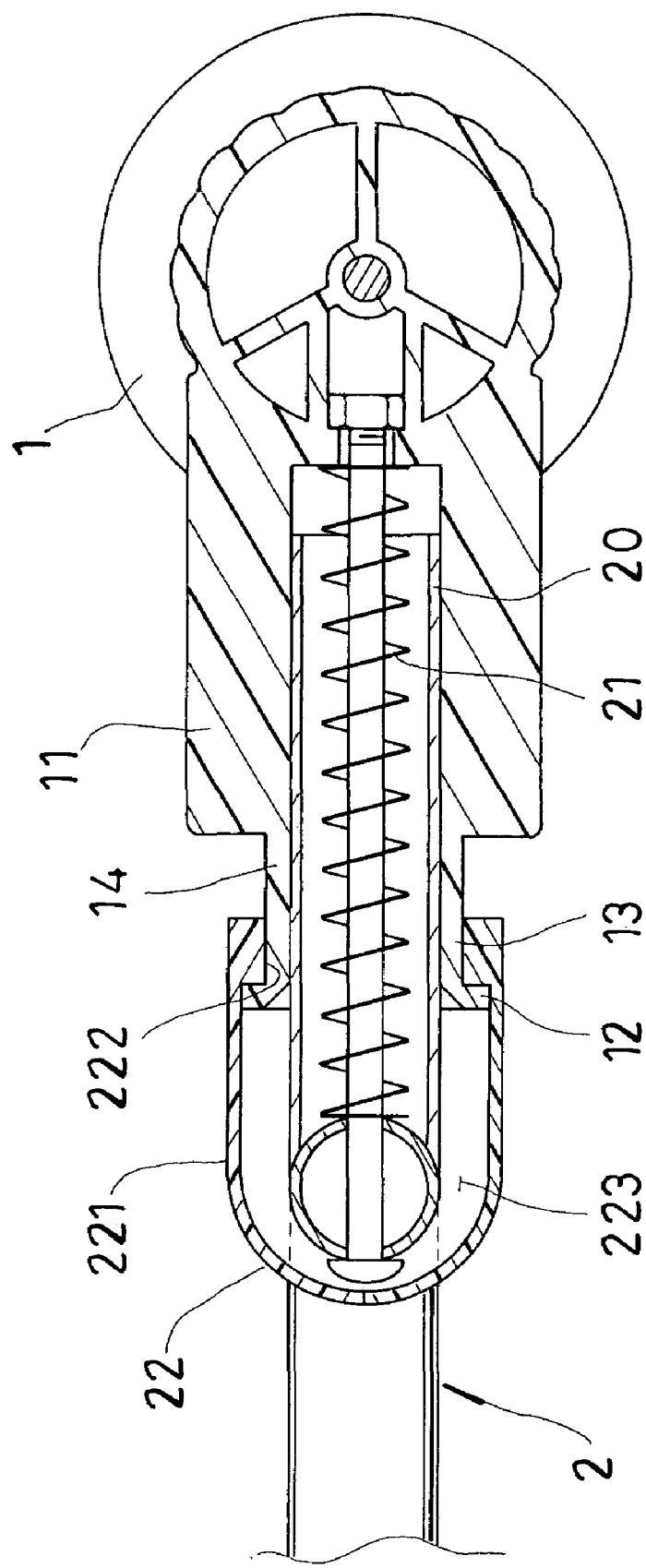
FIG. 3 is a sectional view of the present invention.

Referring to FIG. 1 to FIG. 3, a preferred embodiment of a foldable front wheel structure of the present invention includes a supporting component 1, a joining shaft 2, and a round rotating member (not numbered), which is coupled to the supporting component 1 through the joining shaft 2.

The supporting component 1 includes a shaft holding part 11, which has a stopping protrusion 12 around an opening thereof. The shaft holding part 11 further has a polygonal fixing portion 13 behind the stopping protrusion 12, and a round pivotal portion 14 behind the polygonal fixing portion 13.

The joining shaft 2 is used to couple the round rotating member to the supporting component 1. The joining shaft 2 includes a shank part 20, and an elastic element 21 to bias the joining shaft 2 to such a position that the joining shaft 2 can't turn relative to the supporting component 1, and the front wheel can't be moved between a stretched in-use position and a folded not-in-use one. The joining shaft 2 is joined to the supporting component 1 with the shank part 20 being positioned around the elastic element 21 and held in the shaft holding part 11 of the supporting component 1. The joining shaft 2 further includes a fixing component 22 secured around a front portion of the shank part 20. The fixing component 22 includes two opposite shell parts 221, which are positioned on two sides of the shank part 20 and around the stopping protrusion 12 of the shaft holding part 11 of the supporting component 1, and are securely joined together to form a containing room 223 therebetween; thus, the joining shaft 2 can be moved forwards and rearwards relative to the supporting component 1 with the stopping protrusion 12 remaining confined in the containing room 223 of the fixing component 22. The fixing component 22 has a polygonal hollow fixing portion 222 adjoining and communicating with the containing room 223; the polygonal hollow fixing portion 222 will fit closely around the polygonal fixing portion 13 of the supporting component 1 to prevent the joining shaft 2 from turning relative to the supporting component 1 if the front wheel is in either one of a stretched in-use position and a folded not-in-use one.

Figure 4:
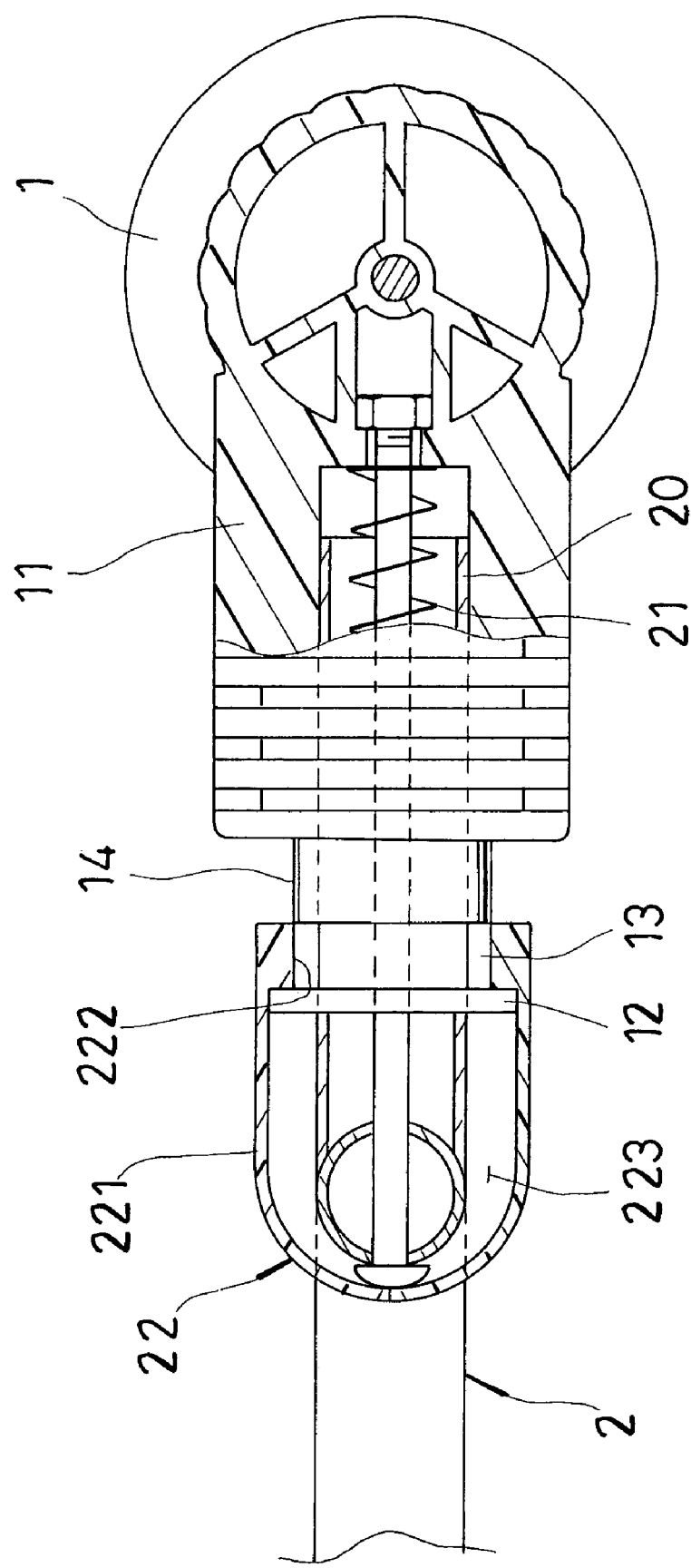
FIG. 4 is a view of the present invention under a folding action (1)

In assembly, referring to FIGS. 2 and 3, the shank part 20 and the elastic element 21 of the joining shaft 1 are passed into the shaft holding part 11 of the supporting component 1, and the shell parts 221 are secured on the joining shaft 2 to comprise the fixing component 22, with the stopping protrusion 12 being contained in the containing room 223 of the fixing component 22; thus, the elastic element 21 normally biases the joining shaft 2 forwards in order for the polygonal hollow fixing portion 222 of the fixing component 22 to fit closely around the polygonal fixing portion 13 of the supporting component 1, as shown in FIG. 4, thus preventing the joining shaft 2 from turning relative to the supporting component 1.

Figure 5:
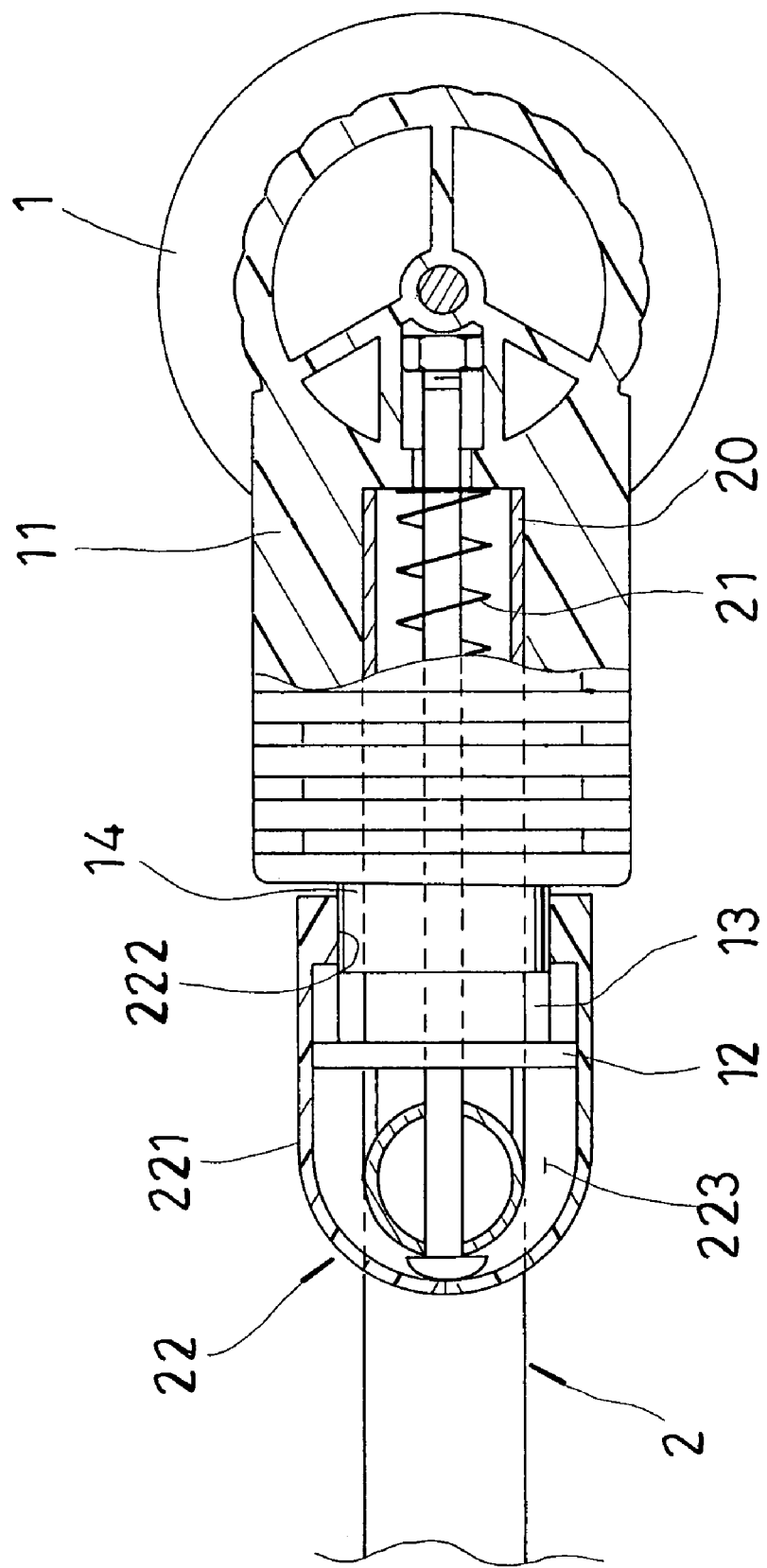
FIG. 5 is a view of the present invention under a folding action (2)
Figure 8:
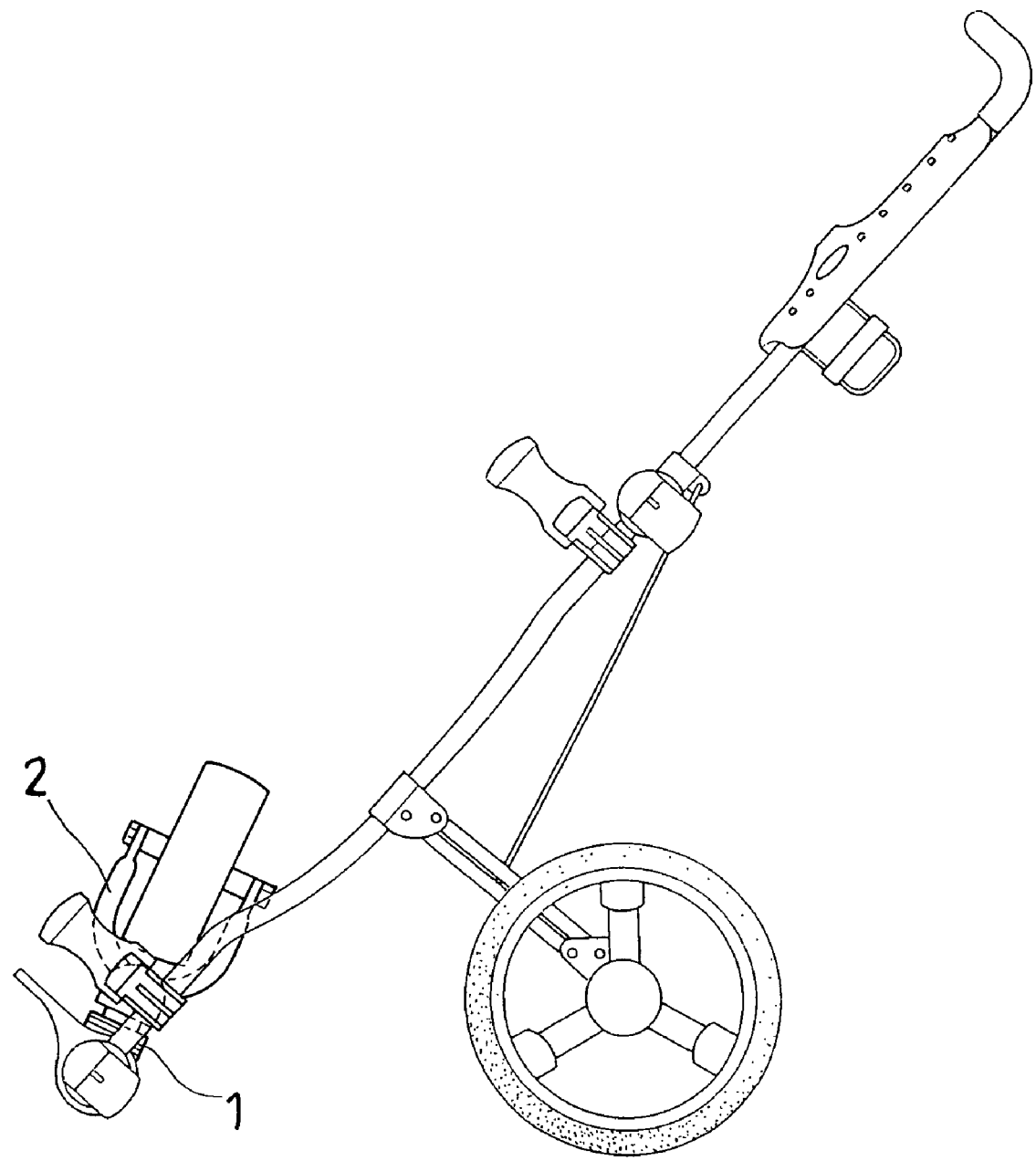
FIG. 8 is a side view of the golf cart with the front wheel of the present invention in the folded not-in-use position.
Figure 9:
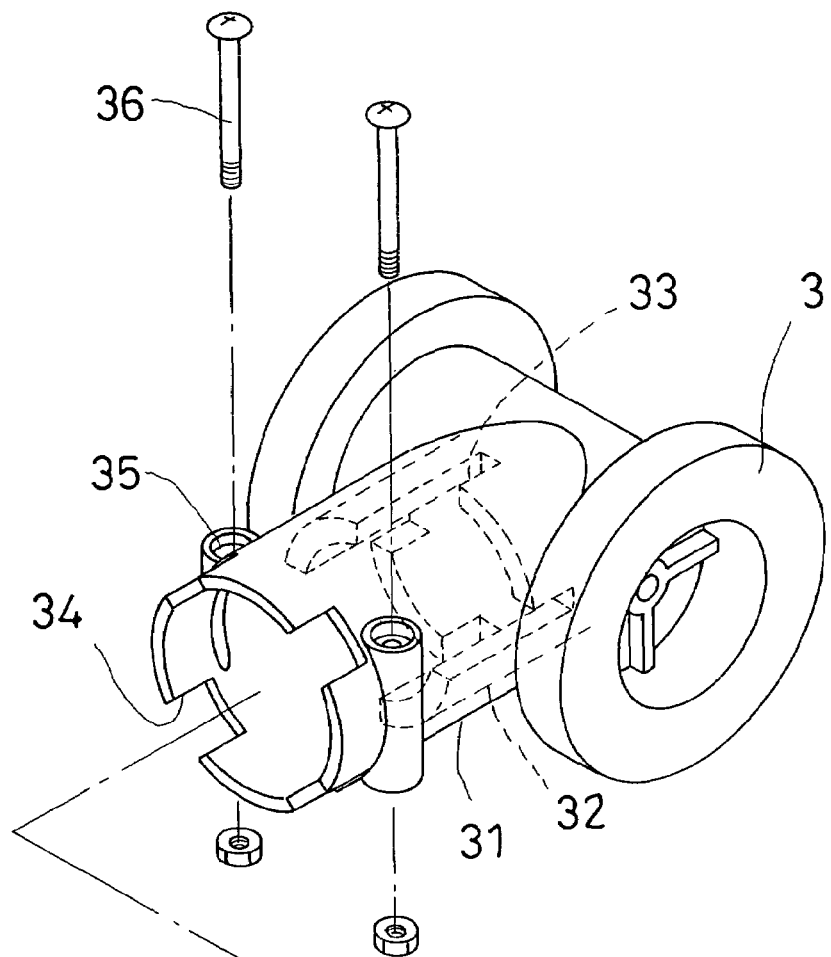
FIG. 9 is an exploded perspective view of the prior art.
Figure 9:
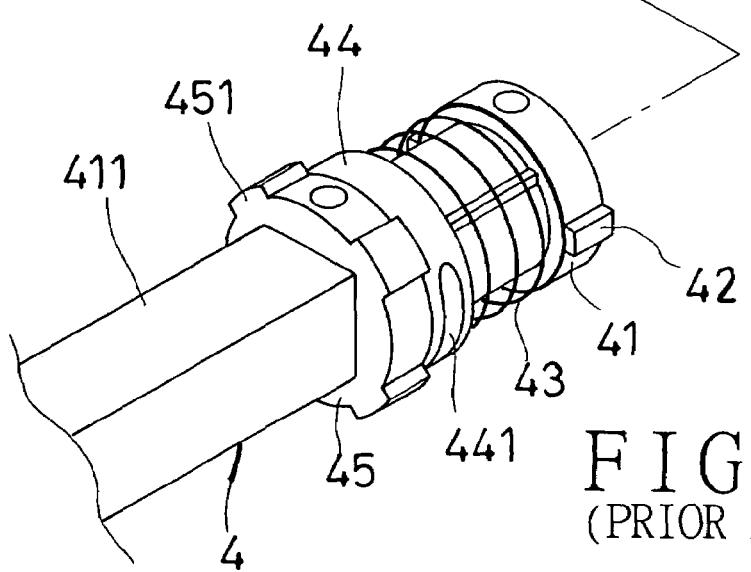
Figure 10:
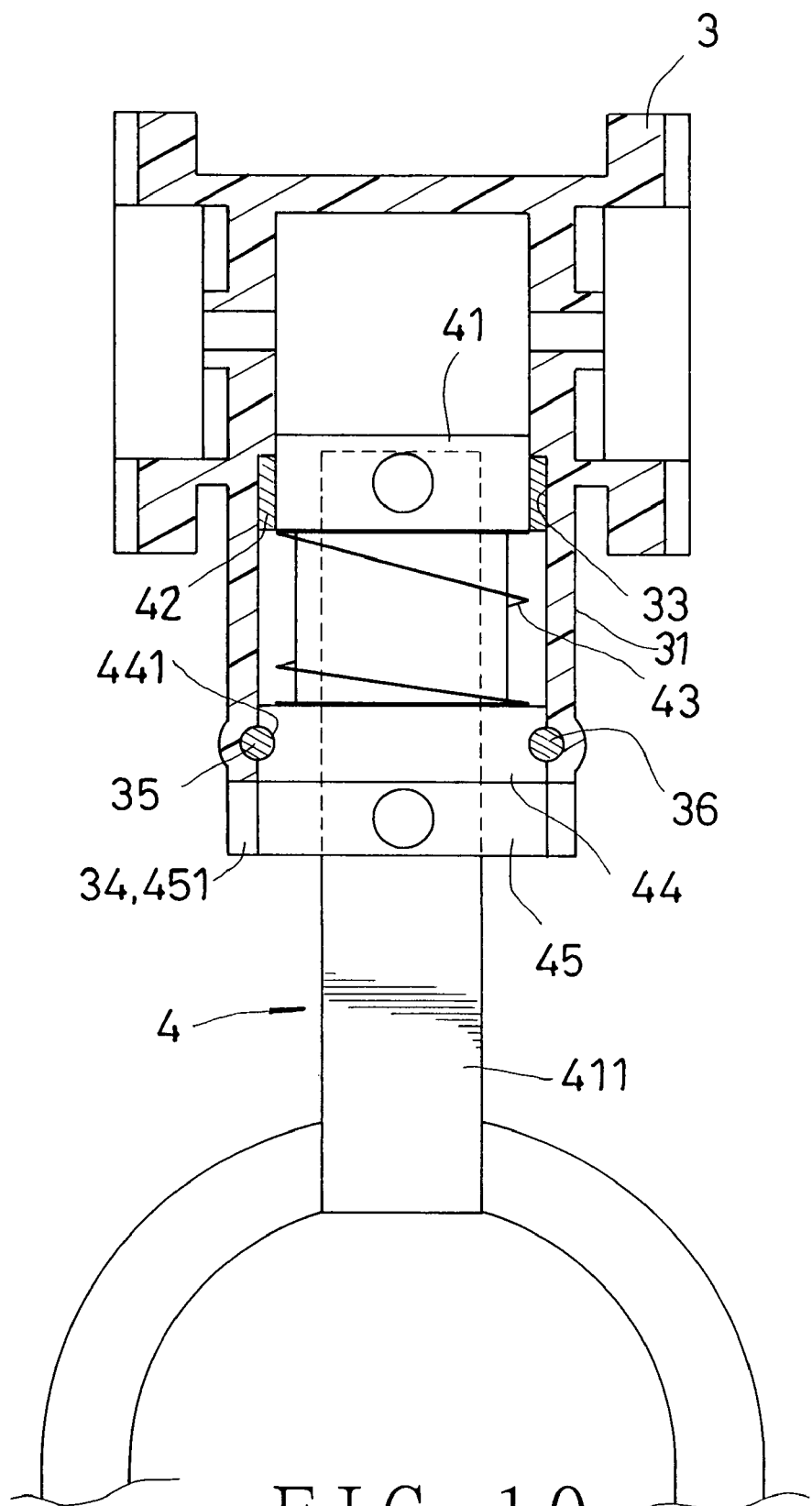
FIG. 10 is a view of the prior art under a folding action (1)
Figure 11:
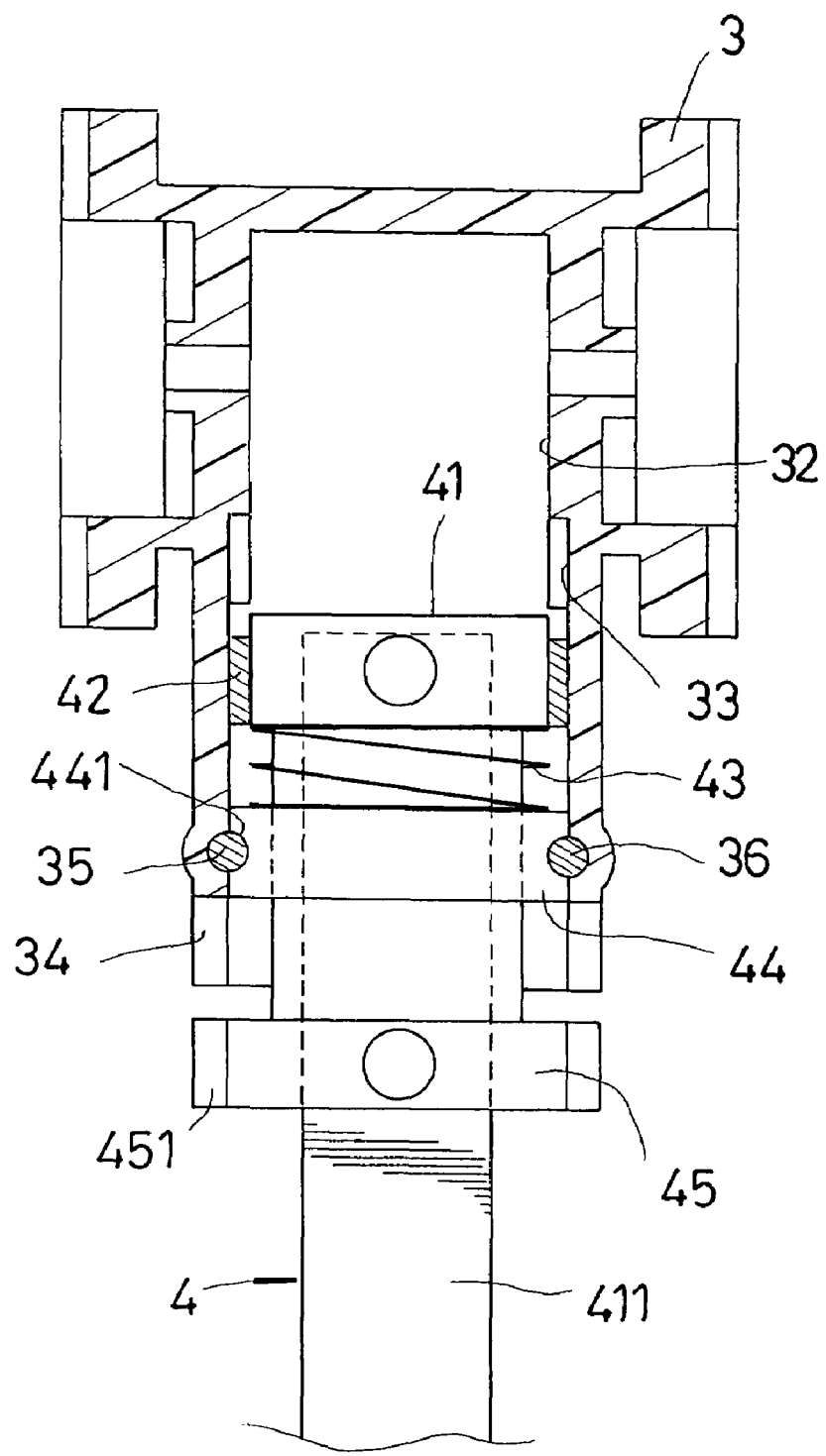
FIG. 11 is a view of the prior art under a folding action (2)
Figure 12:
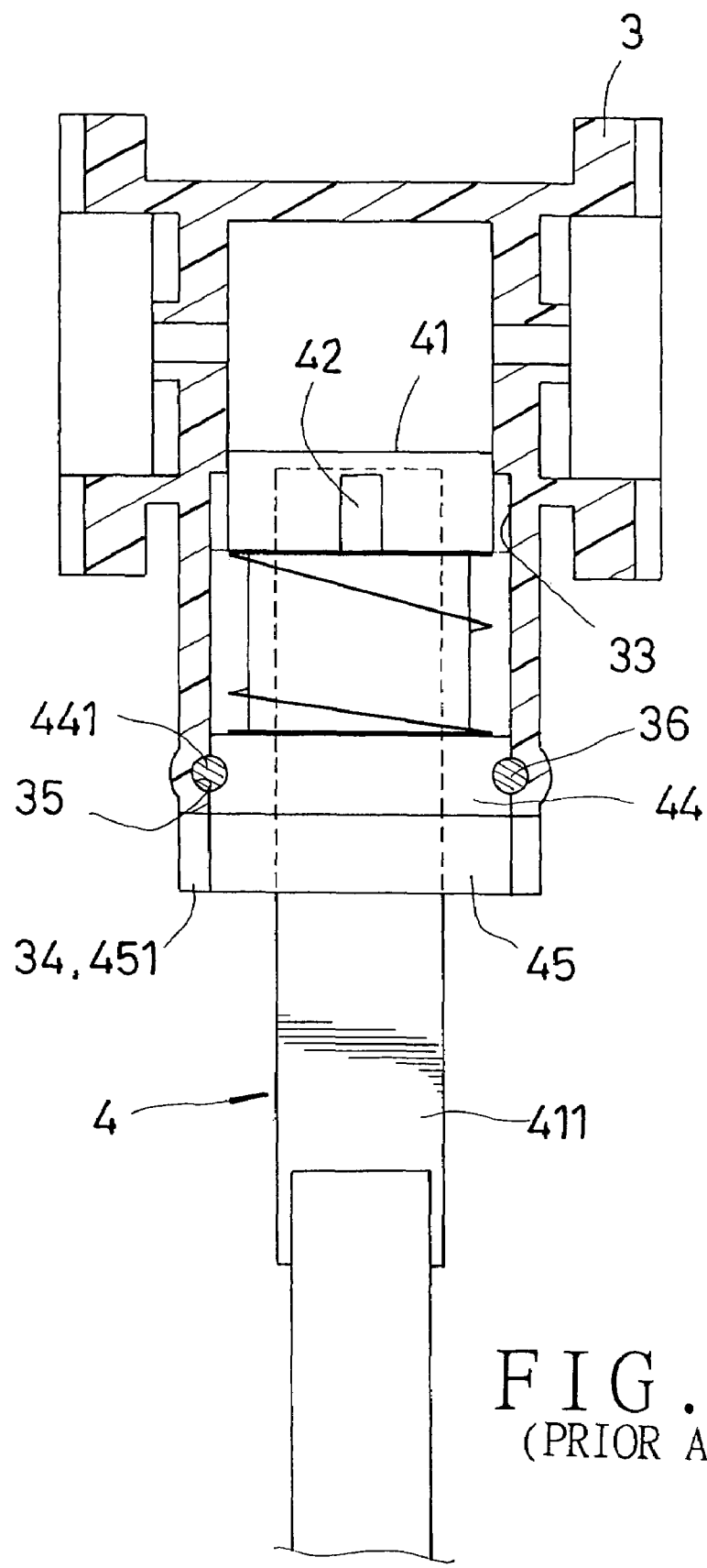
FIG. 12 is a view of the prior art under a folding action (3).

The polygonal hollow fixing portion 222 of the fixing component 22 of the joining shaft 2 will be relocated around the round pivotal portion 14 of the supporting component 1, with the polygonal fixing portion 14 being held in the containing room 223 together with the stopping protrusion 12, if the joining shaft 2 is pushed further inwardly of the shaft holding part 11 of the supporting component 1, as shown in FIG. 5; thus, the joining shaft 2 together with the round rotating member can be turned relative to the supporting component 1. The user should turn the joining shaft 1 and pivot the supporting mechanism to move the front wheel to the not-in-use folded configuration, as shown in FIG. 8. After the front wheel has been moved to the folded configuration, the user should stop pushing the joining shaft 1 in order for the polygonal hollow fixing portion 222 of the fixing component 22 to fit closely around the polygonal fixing portion 13 of the shaft holding part 11 of the supporting component 1 again, thus preventing the joining shaft 2 from turning relative to the supporting component 1. Consequently, the front wheel is fixed in the folded not-in-use position as shown in FIG. 8. Therefore, the joining shaft 2 together with the round rotating member of the front wheel can be turned in either of clockwise direction and counterclockwise one to move the front wheel to the folded not-in-use position after the joining shaft 2 is pushed so as to make the fixing component 22 disengaged from the polygonal fixing portion 13 of the shaft holding part 11 of the supporting component 1.

Figure 6:
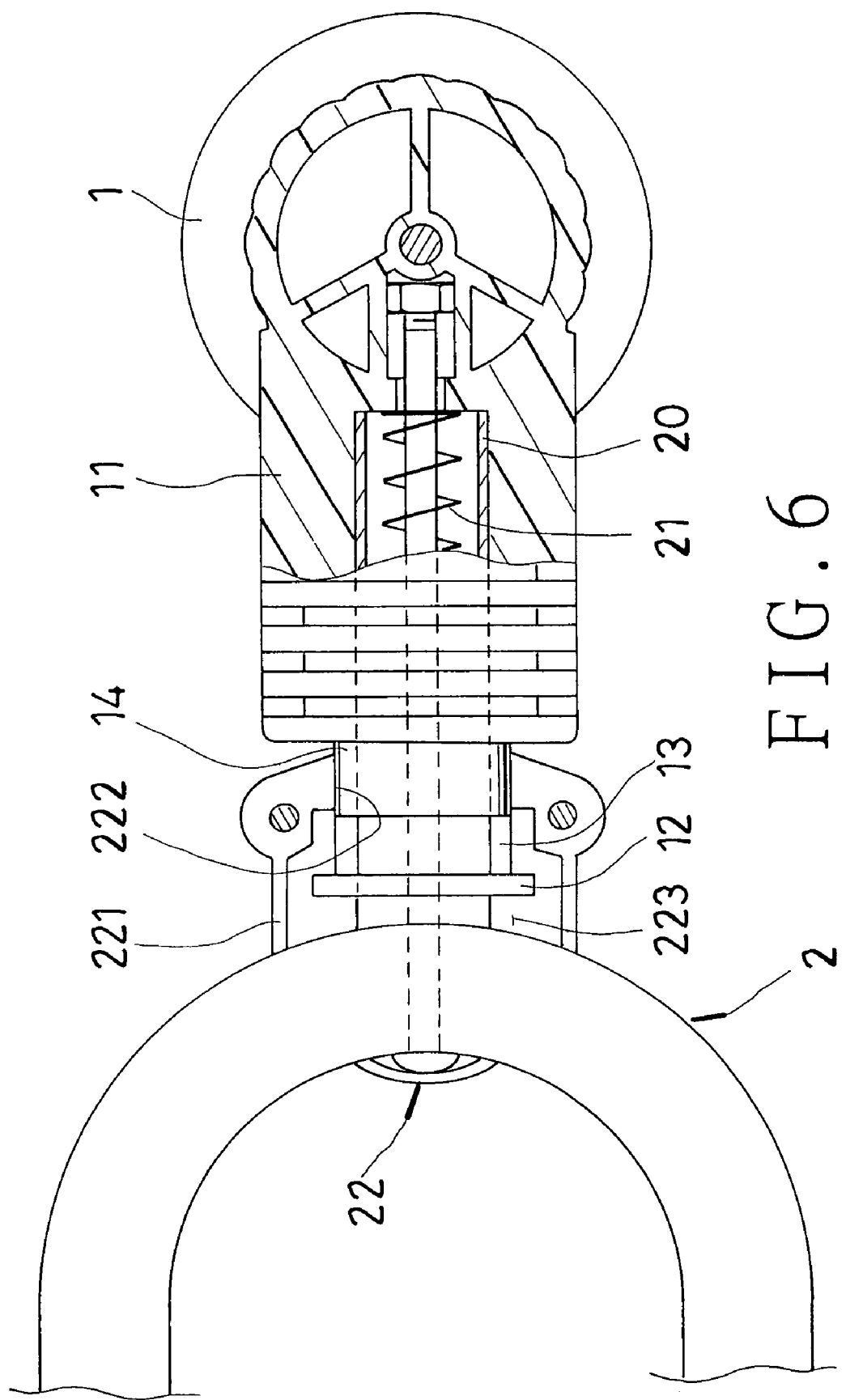
FIG. 6 is a view of the present invention under a folding action (3)
Figure 7:
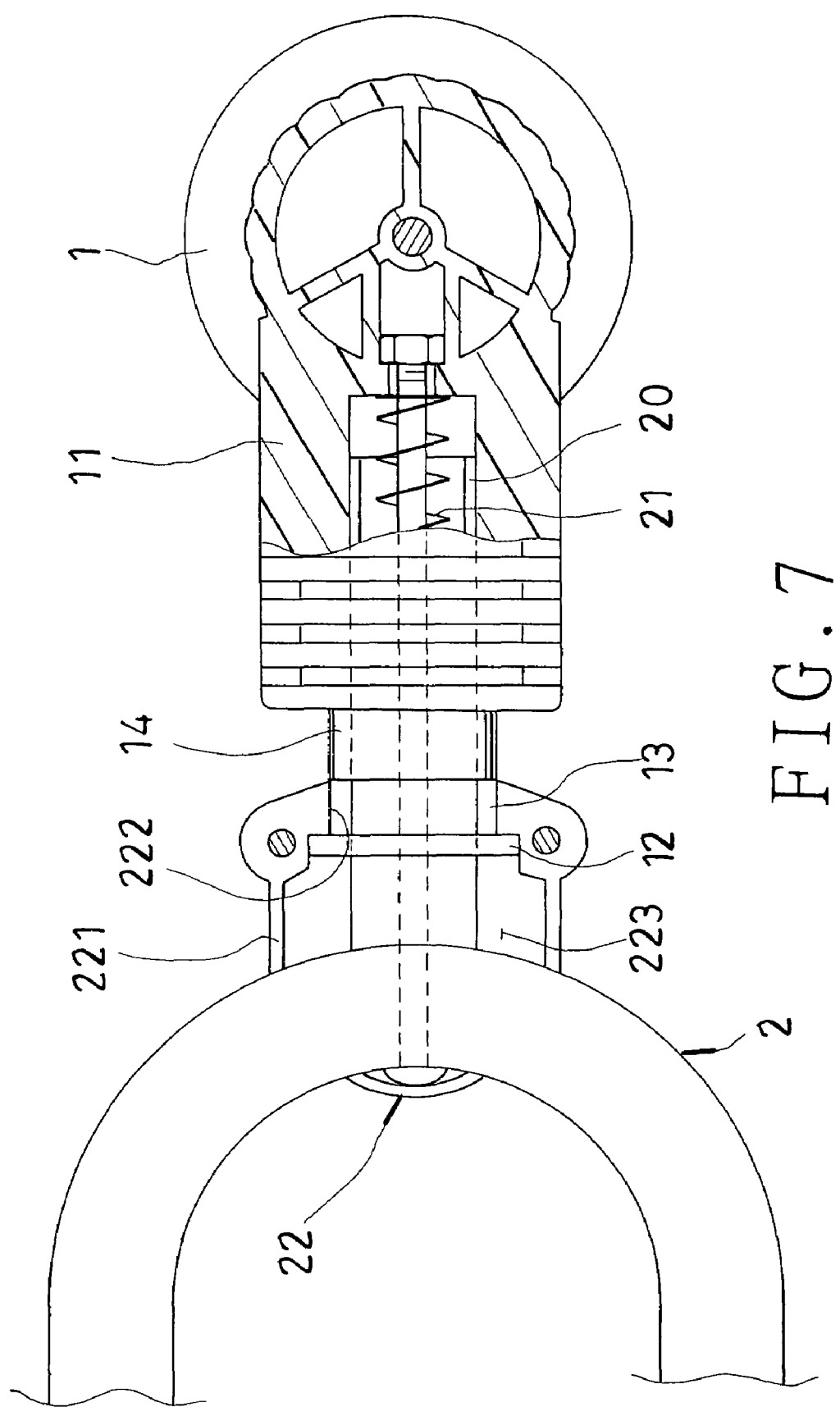
FIG. 7 is a view of the present invention under a folding action (4)

Therefore, the joining shaft 2 together with the round rotating member of the front wheel can be turned so as to move the front wheel from the folded not-in-use position to the stretched in-use one after the joining shaft 2 is pushed in order for the shank part 20 to move further into the shaft holding part 11 of the supporting component 1, as shown in FIG. 6. After the joining shaft 2 together with the round rotating member is turned so as to move the front wheel to the stretched in-use position, the user should stop pushing the joining shaft 2 in order for the polygonal hollow fixing portion 222 of the fixing component 22 to fit closely around the polygonal fixing portion 13 of the supporting component 1 again, as shown in FIG. 7. Consequently, the front wheel is fixed in the stretched in-use position as shown in FIG. 1. For the above reason, the joining shaft 2 together with the round rotating member of the front wheel can be turned in either of clockwise direction and counterclockwise one to move the front wheel to the stretched in-use position after the joining shaft 2 is pushed so as to make the fixing component 22 disengaged from the polygonal fixing portion 13 of the supporting component 1.

From the above description, it can be easily seen that the present invention has the following advantages:

1. The joining shaft together with the round rotating member of the front wheel can be turned in either of clockwise direction and counterclockwise one to move the front wheel between a stretched in-use position and a folded not-in-use one after the fixing component is disengaged from the polygonal fixing portion of the supporting component. Therefore, the foldable font wheel structure of the present invention can be easily operated by not only those people who prefer using their right hands but also those people who prefer using their left hands. In other words, the present invention is relatively convenient to use.

2. The shaft holding part of the supporting component has a front stopping protrusion confined in the containing room of the fixing component of the joining shaft. Therefore, the joining shaft can't separate from the supporting component when the front wheel is fixed in either one of the in-use position and the not-in-use one with the polygonal hollow fixing portion of the fixing component fitting closely around the polygonal fixing portion of the supporting component.

What is claimed is:

1. Structure of a foldable front wheel of a golf cart, comprising
   (a) a supporting component; the supporting component including a shaft holding part; the shaft holding part having a stopping protrusion around one end thereof; the shaft holding part having a polygonal fixing portion behind the stopping protrusion; the shaft holding part having a round pivotal portion behind the polygonal fixing portion thereof; and
   (b) a joining shaft interposed between and joined to both the supporting component and a front round rotating member; the joining shaft including:

a shank part; the shank part being held in the shaft holding part of the supporting component at one end thereof;

an elastic element positioned in the shaft holding part of the supporting component to bias the joining shaft to such a position that the joining shaft is prevented from rotating by the supporting component; and a fixing component secured around other end of the shank part; the fixing component having a containing room; the stopping protrusion of the supporting component being confined in the containing room; the fixing component having a polygonal hollow fixing portion adjoining and communicating with the containing room;

the elastic element biasing the joining shaft towards such a position that the polygonal hollow fixing portion of the fixing component fits closely around the polygonal fixing portion of the supporting component to prevent the joining shaft from turning relative to the supporting component; the joining shaft being capable of rotating after having been pushed so as to relocate the polygonal hollow fixing portion of the fixing component around the round pivotal portion of the supporting component.

2. The structure of a foldable front wheel of a golf cart as claimed in claim 1, wherein the fixing component includes two opposite shell parts, which are securely joined together.

* * * * *